United States Patent
Matsu et al.

(10) Patent No.: US 8,505,410 B2
(45) Date of Patent: Aug. 13, 2013

(54) TWO-PIECE STEERING WHEEL BACK-COVER FOR IMPROVED SAFETY PERFORMANCE

(75) Inventors: Richard Matsu, Plymouth, MI (US);
Delia Dumitrecu, Livonia, MI (US);
Mark Ressler, Waterford, MI (US);
Anthony Gloriosa, Dublin, OH (US)

(73) Assignee: Autoliv ASP, Inc., Ogden, UT (US)

( * ) Notice: Subject to any disclaimer, the term of this patent is extended or adjusted under 35 U.S.C. 154(b) by 1259 days.

(21) Appl. No.: 11/513,494

(22) Filed: Aug. 31, 2006

(65) Prior Publication Data

US 2008/0053268 A1  Mar. 6, 2008

(51) Int. Cl.
*B62D 1/04* (2006.01)
*G05G 1/10* (2006.01)
*B62D 1/11* (2006.01)

(52) U.S. Cl.
CPC ........................... *B62D 1/11* (2013.01)
USPC ........... 74/558.5; 74/552; 29/894.1; 280/731; 280/750; 280/777

(58) Field of Classification Search
USPC .............. 74/552, 558.5; 29/894.1; 280/731; 280/777, 750; 188/371
See application file for complete search history.

(56) References Cited

U.S. PATENT DOCUMENTS

| | | | | |
|---|---|---|---|---|
| 2,596,784 A * | 5/1952 | Nagin | ............................. | 74/552 |
| 3,992,041 A * | 11/1976 | Vernocchi | ..................... | 280/750 |
| 4,411,331 A | 10/1983 | Hanada | | |
| 5,040,646 A * | 8/1991 | Drefahl | ......................... | 188/371 |
| 5,356,178 A * | 10/1994 | Numata | ........................ | 280/777 |
| 5,450,769 A | 9/1995 | Hu et al. | | |
| 5,778,734 A | 7/1998 | Uchida | | |
| 5,802,924 A | 9/1998 | Johnson et al. | | |
| 5,810,391 A * | 9/1998 | Werner et al. | ................. | 280/731 |
| 5,868,041 A * | 2/1999 | Suzuki | ............. | 74/552 |
| 5,896,661 A * | 4/1999 | Worrell et al. | ............... | 29/894.1 |
| 6,003,406 A * | 12/1999 | Lee et al. | ......................... | 74/552 |
| 6,173,627 B1 | 1/2001 | Isomura | | |
| 6,276,711 B1 | 8/2001 | Kurz et al. | | |
| 6,578,449 B1 | 6/2003 | Anspaugh et al. | | |
| 6,663,142 B2 * | 12/2003 | Terao et al. | ................... | 280/731 |
| 2004/0154429 A1 | 8/2004 | Rhea et al. | | |

FOREIGN PATENT DOCUMENTS

WO    WO 03/047943 A1    6/2003

* cited by examiner

*Primary Examiner* — Vinh Luong
(74) *Attorney, Agent, or Firm* — Madson IP, P.C.

(57) ABSTRACT

A new type of steering wheel cover is designed for use with a steering wheel that has one or more spokes. The cover will include an upper portion and a lower portion. Generally, the lower portion is the region or portion of the steering wheel that is positioned at the junction between the spoke and the steering wheel rim. The upper portion and the lower portion are separated by at least one split line. The split line is designed such that during a crash or accident, the upper portion and the lower portion will collapse into each other and absorb some of the energy of the impact.

13 Claims, 3 Drawing Sheets

TWO-PIECE STEERING WHEEL BACK-COVER FOR IMPROVED SAFETY PERFORMANCE

BACKGROUND OF THE INVENTION

1. Field of the Invention

The present invention relates to steering wheel covers for automobiles, trucks, and motor vehicles. More specifically, the present invention relates to covers adapted to enclose portions of the steering wheel assembly.

2. Description of Related Art

Steering wheel back covers are commonly used in vehicles to act as an aesthetic and protective cover for the inner workings of the steering wheel and its interface with the steering column. In modern vehicles, steering wheel covers also serve to protect the delicate electronics attached to controls positioned in the steering wheel or placed in control levers extending from the steering column. As a result, steering wheel back covers are generally substantially rigid in structure. Moreover, most steering wheel covers and steering wheel systems are held in their proper position through the use of screws or other fasteners. As a result, the overall steering wheel system (including the steering wheel cover) is often a very stiff, rigid product.

Unfortunately, the rigidity of these steering wheel systems has created some problems and design concerns for vehicle manufacturers. The reason for this is that during a crash or accident, the driver of the vehicle will often impact the steering wheel. Generally, the steering wheel is designed such that the steering wheel will bend or deform during impact in order to dissipate some of the energy of the crash and properly decelerate the vehicle occupant. However, the increased rigidity of the steering wheel covers reduces the ability of the steering wheel system to deform or bend during a crash. As such, these rigid steering wheel covers will significantly reduce the ability of the steering wheel system to dissipate some of the energy of the crash.

As is known in the art, the problems associated with the use of rigid steering wheel systems are exacerbated for smaller, lighter vehicle occupants (such as "petite" female drivers that fall in the 5$^{th}$ percentile for height and weight). In general, smaller and lighter people tend to position their seats very forward and close to the steering wheel (i.e., so that their feet can reach the pedals). Because these individuals are so close to the steering wheel, these people will generally strike the lower portions of the steering wheel very forcefully and quickly during a crash. (This lower region of the steering wheel that is impacted by smaller, lighter individuals is often referred to as the "6:00 o'clock region" as this region of the circular wheel is proximate to the position of the numeral "6" on the standard circular-shaped clock.)

In order to properly protect these smaller, lighter individuals, it is desirable to have the steering wheel system bend in a controlled fashion to dissipate some of the energy of the impact. Accordingly, vehicle manufacturers have put forth specifications which require steering wheel producers to develop a system that will allow the 6:00 o'clock region of the steering wheel to properly and easily deform/bend during impact. However, to date, an acceptable system that accomplishes this goal has not yet been achieved without compromising the desired stiff cover design geometry.

Accordingly, it would be an advancement in the art to provide an acceptable steering wheel system (including a steering wheel cover) that will properly and adequately deform/bend during impact and will protect the smaller, lighter vehicle driver. Such a system is disclosed herein.

BRIEF SUMMARY OF THE INVENTION

A new type of steering wheel cover for use in a steering wheel system is disclosed herein. The steering wheel cover is designed to be used with a steering wheel that includes one or more spokes that extend from the center of the wheel to the outer rim of the wheel. The steering wheel cover will generally be made of molded plastic materials (such as thermoplastic), although other materials may also be used.

The steering wheel cover includes an upper portion and a lower portion. The lower portion is the portion of the cover that is positioned proximate the spokes whereas the upper portion is the portion proximate the center. The upper and lower portions are separated via a split line. More than one split line may also be used. The split line is a cut, incision or other separation that is placed between the upper and lower portions. Generally, the division of the split line will be relatively small such that the edges of the upper portion and the lower portion will effectively abut each other. In other embodiments, the split line will not be a complete separation between the upper and lower portions; rather, the split line will comprises a series of perforations in the cover that are designed to tear or separate in the event or a crash.

The split line is transverse (i.e., across) the spoke and is positioned at or near the desired bending axis of the cover for energy absorption performance. The bending axis is a theoretical transverse line around which the complete steering wheel system that lacks any sort of split lines (or tear seam, area of reduced thickness, etc.) is desired to bend for ideal energy absorption performance as required by the vehicle crash characteristic. The bending axis is often located along the longitudinal length of the lower spoke and may vary according to each particular steering wheel embodiment.

The use of the split line will provide significant advantages over previously known steering wheel covers and steering wheel systems. Specifically, in the event of an accident or crash, the cover of the present embodiments will stiffen the overall steering wheel system. During an impact or crash, the cover will begin to deform and collapse inwardly as a result of the vehicle occupant being thrust forward into the steering wheel system. As the steering wheel cover begins to deform due to the impact, the split line between the upper and lower portions will cause the portions to collapse into one another. In some embodiments, this occurs by having the upper portion (or a leading edge or region of the upper portion) collapse and/or slide under the lower portion during the impact. Other embodiments are designed such that during impact, the portions will collapse into one another by having the lower portion (or a leading edge or region of the lower portion) slide under the upper portion.

The fact that the upper and lower portions will collapse into each other during an impact provides significant advantages over previously known systems. Specifically, this collapsing of the portions means that the steering wheel system will be less rigid (overall) and more susceptible to desired deformation and bending during a crash. Accordingly, vehicle occupants (including smaller, lighter occupants) that impact the 6:00 o'clock region of the steering wheel will receive greater protection.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the steering wheel system of the present invention, as represented in the Figures, is not intended to limit the scope of the invention, as claimed, but is merely representative of presently preferred embodiments of the invention.

Figure 1:
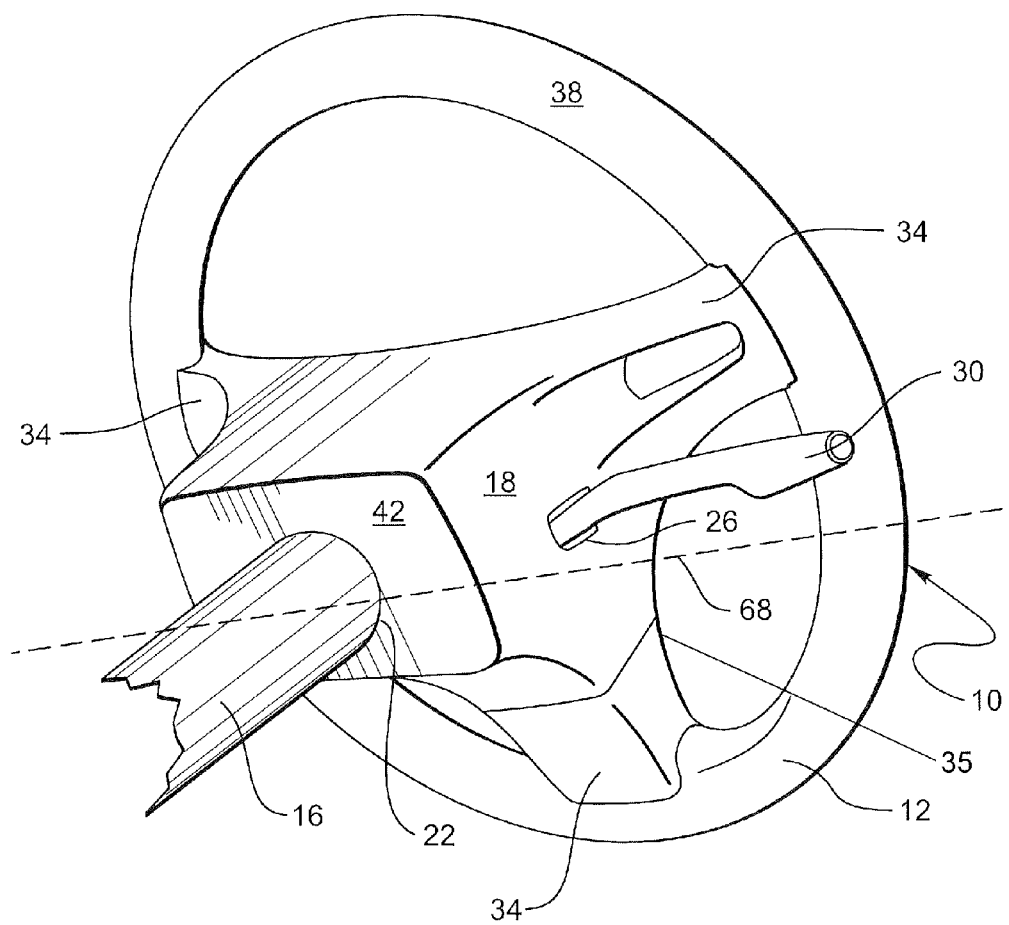
FIG. 1 is a perspective view of the rear of a steering wheel system (including a steering wheel cover) according to the present embodiments.

Referring first to FIG. 1, a steering wheel system 10 of the present embodiments is illustrated. The system 10 will include a steering wheel 12 that may be attached to a steering column 16. The steering wheel system 10 may also include a steering wheel back cover 18 (or steering wheel cover) that is designed to house all or a portion of the steering wheel 12 and/or the steering column 16. As is known in the art, the steering wheel back cover 18 may include an orifice 22 that permits the back cover 10 to be installed about the steering column 16.

Additionally, the steering wheel cover 18 may include one or more accessory openings 26 through which an accessory control 30 positioned near the steering wheel 12 protrudes for access by a vehicle operator (not shown). Such accessory controls 30 may include gear shift levers, headlight/turn signal levers, windshield wiper levers, speed controls, radio controls, a message center, or other controls which may be conveniently placed near a steering wheel 12 for easy access by a vehicle operator.

The back cover 18 is made of a molded plastic material such as thermoplastic that has been molded into the proper shape/configuration. Testing has shown that these types of plastic materials are well suited for aesthetic and cost effective covering of the steering wheel than other types of materials. However, depending on the specifications and the particular embodiment, different materials may also be used.

The steering wheel 12 includes one or more spokes (not shown specifically because of being obscured by the back cover 18, but generally identified by reference number 34. As is known in the art, spokes 34 are routinely added to steering wheels as a means of connecting the rim 38 of the steering wheel 12 to a center portion that may house an airbag (not show) and/or other features including the vehicle's horn, user selection buttons, message screens, "cruise control" or other speed controls, radio controls, etc. The steering wheel 12 shown in FIG. 1 has three spokes 34; however other embodiments in which the wheel 12 has more or less than three spokes 34 are also possible and known in the art.

In the embodiment shown in FIG. 1, the steering wheel cover 18 extends along the length of the spokes 34 until the spokes 34 intersect with the rim 38 of the steering wheel 12, thereby housing at least a portion of the steering wheel 12, namely the spokes 34. That portion of the steering wheel 12 (obscured from view by the back cover 18) that is housed within the back cover 18 is generally designated by reference number 35. However, other embodiments may also be constructed in which the cover 18 ends prior to the junction between the spoke 34 and the rim 38.

In FIG. 1, the back cover 18 is shown to be substantially rectangular in shape with rounded corners and edges. Those of skill in the art will recognize that these structures may have a wide variety of shapes within the scope of the invention. Specifically, the cover 18 may be constructed to form a round or ovoid cylindrical structure, or may be more significantly flattened to avoid intrusion of the cover 18 into the vehicle operator's field of view.

Figure 2:
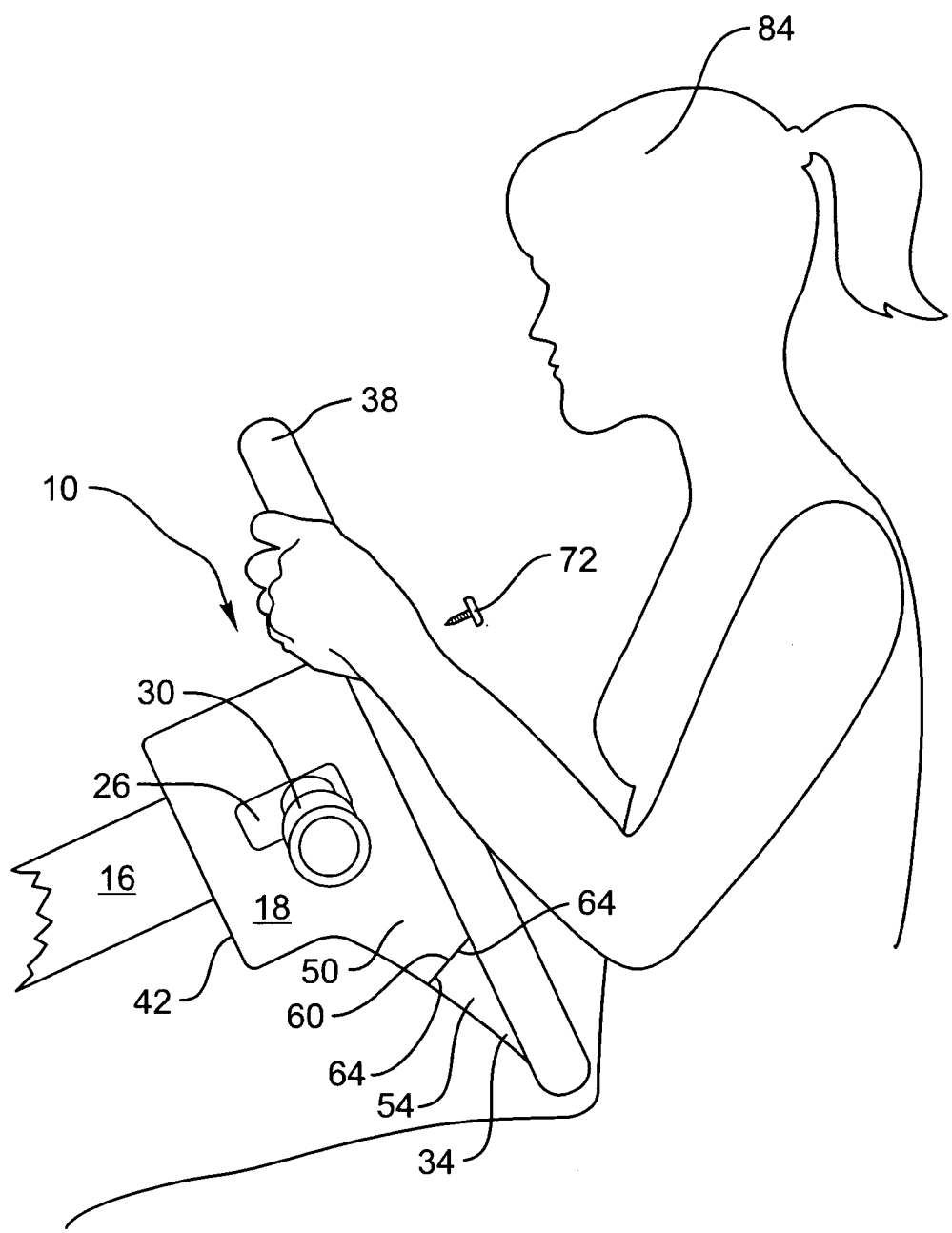
FIG. 2 is a side view of the steering wheel cover of FIG. 1 showing an occupant near the steering wheel.

Referring now to FIG. 2, a side view of the system 10 is illustrated for purposes of illustration and clarity. The steering wheel system 10 is shown proximate a vehicle occupant 84. As can be seen in FIGS. 1 and 2, the cover 18 includes an upper portion 50 and a lower portion 54. Generally, the lower portion 54 is the region or portion of the steering wheel 12 that is positioned at the junction between the spoke 34 and the steering wheel rim 38. The upper portion 50 is the portion proximate the orifice 22 and steering column 16. It should be noted however that the portions 50, 54 are designated as being "upper" and "lower" in the present exemplary embodiment, one of skill in the art will recognize that the structures of the portions 50, 54 may be adapted to be attached about a steering wheel assembly in a large number of orientations, including the exemplary "upper" and "lower" configuration shown.

The upper and lower portions 50, 54 are separated via a split line 60. More than one split line 60 may also be used. The split line 60 is a cut, incision, separation, or weakening of the material that is placed between the upper and lower portions 50, 54. Generally, the split line 60 will be relatively small such that the edges of the upper portion 50 and the lower portion 54 will effectively abut each other. It should also be noted that is some embodiments, the split line 60 will not be a complete separation between the upper and lower portions 50, 54. Rather, in some embodiments, the split line comprises a weakening of the material or a series of perforations in the cover 18 that are designed such that in the event of an impact, the perforations will tear or separate so that the upper and lower portions 50, 54 become distinct elements.

It should also be noted that in the embodiment shown in FIG. 2, the split line 60 extends along substantially the entire perimeter of the cover 18, which in essence, separates the back cover 18 into two distinct pieces. However, other embodiments may also be constructed in which the split line 60 does not extend along substantially the entire perimeter of the cover 18. Rather, in these embodiments, one or more of the edges 64 of the split line 60 will still be joined together.

The split line 60 is substantially transverse to the spoke 34. As used herein, the term "transverse to the spoke" means that the split line 60 will be perpendicular or substantially perpendicular to the spoke 34 as it extends outwardly towards the rim 38 from the center 42. In the embodiment shown in FIG. 2, the split line 60 is exactly perpendicular to the spoke 34 as it extends outwardly away from the center 42.

In many of the presently preferred embodiments, the split line 60 will also be positioned at or near the bending axis 68 of the steering wheel cover 18. (The bending axis 68 is shown in FIG. 1). The "bending axis" is a theoretical transverse line around which the complete steering wheel system is desired to bend for ideal energy absorption performance as required by the vehicle crash characteristic. The bending axis will generally be located along the longitudinal length of the spokes 34 and may vary according to each particular steering wheel embodiment. Factors that will influence and determine the location of the bending axis 68 include the material used to make the steering wheel and the cover, the size, length and dimensions of the steering wheel system, the rigidity of the steering wheel system, the presence/location of any screws or fasteners that are designed to restrict movement of steering wheel components etc. Other factors influencing the position of the bending axis 68 includes the point of impact (i.e. 6:00) and the direction of the force impacting the steering wheel. Those of skill in the art will know and understand how the location of the bending axis 68 may be determined. In many of the present embodiments, the position of the bending axis 68 is selected such that the point of impact will be at or near the 6:00 position and will be generally perpendicular to the steering wheel. In many embodiments, the bending axis 68 will be perpendicular or substantially perpendicular to the spoke 34.

Such positioning of the split line 60 at or near the bending axis 68 has significant advantages. Specifically, as is discussed in greater detail herein, the split line 60 will stiffen the steering wheel system during a crash. Rather, the presence of the split line 60 allows the steering wheel cover 18 to collapse and deform during a crash as a means of absorbing some of the energy of the impact.

Referring still to FIG. 2, optional features of the steering wheel system 10 is illustrated. As is known in the art, one or more screws (or other fasteners) are often used to attach the cover 18 to the steering wheel 12 and to lock the components of the steering wheel system 10 in the proper position. Such screws generally result in increasing the overall rigidity (stiffness) of the steering wheel system 10. However, as is shown in FIG. 2, the cover 18 may be designed such that one or more of these screws are absent (either removed or omitted). Specifically, other embodiments may be constructed in which the "12:00 o'clock" screws 72—i.e., the screws that attach the cover 18 to the center 42 of the steering wheel 18—have been removed. Other embodiments may also be constructed in which other screws that attach/connect the cover 18 to the steering wheel 18 have been removed or omitted. Other screws may also be removed or omitted, including screws that fit into a rear portion of the steering wheel center 42.

This removal or omission of the screws 72 (or other screws) may have the effect of decreasing the rigidity of the steering wheel system 10 and allowing the system 10 to more easily deform and absorb some of the energy of the crash. It should be noted that, in some embodiments, removal or omission of the screws 72 (or other screws) may cause additional rattling, buzzing, or squeaking of the steering wheel system 10 and/or may change the overall visual appearance and "finish" of the steering wheel system 10. Accordingly, some vehicle manufactures may choose to include the screws 72 (or other screws) as part of the steering wheel system 10.

Figure 3:
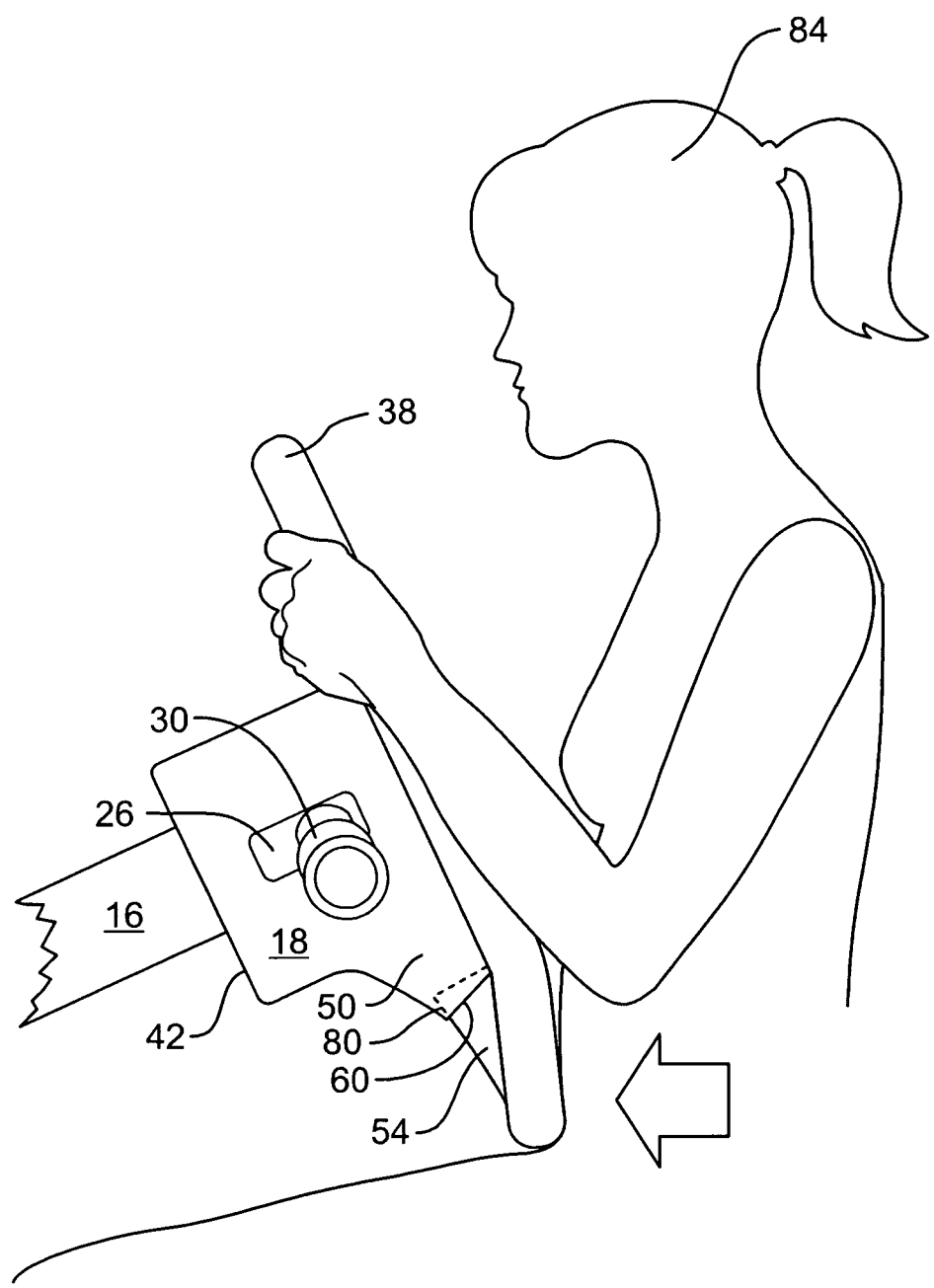
FIG. 3 is a side view of the steering wheel cover of FIG. 1 after the steering wheel system has experienced the force of a crash or accident.

Referring now to FIG. 3, the steering wheel cover 18 of the present embodiments is illustrated after the steering wheel system 10 has undergone impact with a vehicle occupant 84. Unlike many of the previously known steering wheel covers, the cover 18 acts to facilitate the desired bending of the system. This is because of the presence of the split line 60 in the cover 18 acts to reduce the stiffness. Specifically, during an impact or crash, the cover 18 will begin to deform and collapse inwardly as a result of the vehicle occupant being thrust forward into the steering wheel system 10, resulting in a force (as shown by the arrow) being applied to the steering wheel 12. As the steering wheel cover 18 begins to deform due to the impact, the split line 60 between the upper and lower portions 50, 54 will cause the portions 50, 54 to collapse into one another, as shown by the dashed lines 80. In some embodiments, this occurs by having the upper portion 50 (or a leading edge or region of the upper portion 50) collapse and/or slide under the lower portion 54 during the impact. Other embodiments, such as the one shown in FIG. 3, are designed such that during impact, the portions 50, 54 will collapse into one another by having the lower portion 54 (or a leading edge or region of the lower portion 54) slide under the upper portion 50. Yet further embodiments may be made in which the upper and lower portions 50, 54 will slide/collapse into each other in a different manner.

The fact that the upper and lower portions 50, 54 will collapse into each other during an impact provides significant advantages over previously known systems. Specifically, this collapsing of the portions 50, 54 means that the steering wheel system 10 will be less rigid (overall) and more susceptible to deformation and bending during a crash. Accordingly, vehicle occupants (including smaller, lighter occupants) that impact the 6:00 o'clock region of the steering wheel 12 will receive greater protection. Moreover, the collapsing of the portions 50, 54 also means that the steering wheel 12 will deform without the possibility that pieces/debris from the steering wheel 12 will impact the occupant during a crash.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A steering wheel cover for use in a steering wheel system with a steering wheel having a spoke and a steering column, the cover comprising:
   an upper portion and a lower portion, the upper and lower portions being separated by a split line disposed proximate a bending axis of the steering wheel, the split line is substantially transverse to the spoke, the cover houses at least a portion of and is disposed on the back of the steering wheel and contacts the steering column.

2. A steering wheel cover as in claim 1, wherein the split line is positioned at the bending axis of the steering wheel.

3. A steering wheel cover as in claim 1, wherein the split line extends along a portion of the perimeter of the cover.

4. A steering wheel cover as in claim 1, wherein the upper and lower portions are separate pieces.

5. A steering wheel cover as in claim 1, wherein the cover is designed such that the split reduces the stiffness of the steering wheel system.

6. A steering wheel cover as in claim 1, wherein the upper portion and the lower portion will collapse into one another during impact on the steering wheel.

7. A steering wheel cover as in claim 1, wherein the lower portion will collapse under the upper portion during impact.

8. A steering wheel cover as in claim 1, wherein the split line is a perforation.

9. A steering wheel cover as in claim 1, wherein the split line is formed by weakening the material used to make the cover.

10. A vehicle steering wheel system having a steering column comprising:
- a steering wheel having at least one spoke; and
- a steering wheel cover comprising an upper portion and a lower portion, the upper and lower portions being separated by a split line disposed proximate a bending axis of the steering wheel, the split line is positioned substantially transverse to the spoke, wherein the upper portion and the lower portion will collapse into one another during impact on the steering wheel, wherein the cover houses at least a portion of and is disposed on the back of the steering wheel and contacts the steering column.

11. A steering wheel system as in claim 10, wherein the lower portion will collapse under the upper portion during impact.

12. A steering wheel system as in claim 10, wherein the split line extends along a portion of the length of the cover.

13. A steering wheel cover as in claim 10, wherein the split line is formed by weakening the material used to make the cover.

* * * * *